(12) United States Patent
Chenoux et al.

(10) Patent No.: US 11,293,308 B2
(45) Date of Patent: Apr. 5, 2022

(54) TURBOMACHINE LUBRICATION UNIT AND METHOD OF MANUFACTURE

(71) Applicant: SAFRAN AERO BOOSTERS SA, Herstal (BE)

(72) Inventors: Mathieu Chenoux, Arlon (BE); Nicolas Fellin, Marchin (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 799 days.

(21) Appl. No.: 16/049,433

(22) Filed: Jul. 30, 2018

(65) Prior Publication Data

US 2019/0055854 A1    Feb. 21, 2019

(30) Foreign Application Priority Data

Aug. 15, 2017   (BE) .................... 2017/5656

(51) Int. Cl.
*B33Y 80/00* (2015.01)
*B33Y 10/00* (2015.01)
(Continued)

(52) U.S. Cl.
CPC .............. *F01D 25/20* (2013.01); *B22F 5/106* (2013.01); *B33Y 10/00* (2014.12); *B33Y 80/00* (2014.12); *F02C 7/06* (2013.01); *F05D 2220/323* (2013.01); *F05D 2230/22* (2013.01); *F05D 2230/72* (2013.01); *F05D 2260/60* (2013.01); *F05D 2260/98* (2013.01)

(58) Field of Classification Search
CPC .. F01D 25/20; F01D 25/18; F02C 7/06; B22F 5/106; B33Y 80/00; B33Y 10/00; F05D 2260/60; F05D 2230/22; F05D 2230/72; F05D 2260/98; F05D 2220/323; Y02T 50/60

See application file for complete search history.

(56) References Cited

U.S. PATENT DOCUMENTS 5,893,404 A * 4/1999 Mendez ............. B22D 11/0631
                                                    164/71.1
7,396,708 B2 * 7/2008 Jan ..................... H01L 21/32134
                                                    257/E21.309
(Continued)

FOREIGN PATENT DOCUMENTS

EP    3127592 A1    2/2017
FR    1333611 A    7/1963
FR    3017413 A1    8/2015

OTHER PUBLICATIONS

Search Report dated May 29, 2018 for BE 201705656.

*Primary Examiner* — Lawrence Averick
(74) *Attorney, Agent, or Firm* — James E. Walton (57) ABSTRACT

An aircraft bypass turbojet engine lubrication unit includes from three to five superposed pumps, a body housing the pumps and an internal passage in the body for communicating with each of the pumps. The material of the body exhibits a stack of layers in a direction of stacking, the pumps being housed in the said stack of layers. The passage exhibits an end in the direction of stacking of the layers and an internal profile, for example triangular, with two straight lines which form the said end and which are inclined with respect to the stacked layers. The lubrication unit may be manufactured by additive manufacturing in layers.

17 Claims, 5 Drawing Sheets

(51) Int. Cl.
    *F01D 25/20*    (2006.01)
    *B22F 5/10*    (2006.01)
    *F02C 7/06*    (2006.01)

(56) References Cited

U.S. PATENT DOCUMENTS

| | | | |
|---|---|---|---|
| 10,023,457 B2 * | 7/2018 | Brown | F16L 15/04 |
| 10,215,317 B2 * | 2/2019 | Burkhart | F16L 9/003 |
| 10,247,296 B2 * | 4/2019 | van der Merwe | F16H 57/02 |
| 10,458,422 B2 * | 10/2019 | Gomanne | F04D 13/028 |
| 10,688,421 B2 * | 6/2020 | Jacquerie | F01D 25/20 |
| 2008/0121617 A1 * | 5/2008 | Jan | H01L 27/1244 |
| | | | 216/41 |
| 2012/0018115 A1 * | 1/2012 | Hovel | B22F 5/003 |
| | | | 164/493 |
| 2015/0316182 A1 * | 11/2015 | Brown | F16L 33/006 |
| | | | 285/220 |
| 2016/0208708 A1 | 7/2016 | Butcher et al. | |
| 2017/0009776 A1 * | 1/2017 | Gomanne | F04C 2/102 |
| 2017/0036144 A1 * | 2/2017 | Jacquerie | B03C 1/286 |
| 2017/0203511 A1 * | 7/2017 | Burkhart | F16L 47/145 |
| 2018/0163845 A1 * | 6/2018 | van der Merwe | B64D 33/08 |

\* cited by examiner

TURBOMACHINE LUBRICATION UNIT AND METHOD OF MANUFACTURE

This application claims priority under 35 U.S.C. § 119 to Belgium Patent Application No. 2017/5656, filed 15 Sep. 2017, titled "Turbomachine Lubrication Unit and Method of Manufacture," which is incorporated herein by reference for all purposes.

BACKGROUND

1. Field of the Application

The present application relates to a lubrication unit and to the method of manufacturing same. The present application also relates to an axial turbomachine, notably an aeroplane turbojet engine or an aircraft turboprop engine.

Description of Related Art

An aeroplane turbojet engine generally comprises a lubrication circuit including a lubrication unit. The lubrication unit is equipped with a plurality of pumps housed in the one same body through which there passes a shaft that drives the rotors of the various pumps.

Document FR3017413 A1 discloses a turbojet engine comprising a lubrication unit driven by a spindle of the turbomachine. The lubrication unit comprises a pump with a casing having an inlet, an outlet and a passage formed in the casing.

Although great strides have been made in the area of lubrication units, many shortcomings remain.

DETAILED DESCRIPTION OF THE PREFERRED EMBODIMENT

The present application aims to address at least one of the problems presented by the prior art. More specifically, it is an objective of the present application to optimize the mass of a lubrication unit. Another objective of the present application is to propose a solution that optimizes flow, is strong, economical, reliable, easy to produce, convenient to service, easy to inspect and improves efficiency.

One subject of the present application is a lubrication unit for a turbomachine, notably an aircraft turbojet engine, the lubrication unit comprising: at least two pumps, and a body which exhibits a passage communicating with each of the pumps, notable in that the material of the body exhibits a stack of layers in a direction of stacking, the pumps being housed in the said stack of layers, and in that the passage exhibits an end in the direction of stacking of the layers, and an internal or external profile with a first straight line and a second straight line which form the said end and which are inclined with respect to the layers of the stack.

According to some preferred embodiments of the present application, the lubrication unit may comprise one or more of the following features, considered alone or in any technically feasible combination:

The first straight line and the second straight line respectively generate a first ruled surface and a second ruled surface, notably a first plane and a second plane, which are inclined with respect to the layers.

The internal profile forms a triangle or a pentagon with a principal elongation in the direction of stacking, notably arranged perpendicular to the layers.

The internal profile further comprises a third straight line which is inclined with respect to the other two and inclined with respect to the layers, the said third straight line possibly connecting the first straight line to the second straight line.

The end of the internal profile comprises a fillet radius connecting the first straight line to the second straight line, the fillet radius being less than or equal to 10 mm or than/to 4 mm.

The passage extends over the majority of the body in the direction of stacking.

The first straight line is parallel to the direction of stacking, or inclined by at most: 15°, or 10°, or 5° with respect to the direction of stacking.

The second straight line is inclined by at least: 30° or 45° with respect to the layers.

The body exhibits a main housing accommodating the at least two pumps, the housing exhibiting a main axis in and/or parallel and/or inclined by at most 20° with respect to the direction of stacking.

The direction of stacking is more inclined with respect to the first straight line and/or with respect to the second straight line than with respect to the main axis.

Each pump comprises a rotor with an axis of rotation in and/or parallel and/or inclined by at most 20° with respect to the direction of stacking of the layers, the rotors possibly being superposed in the direction of stacking.

The lubrication unit comprises a drive shaft for driving the pumps, the drive shaft passing through most of the layers.

The at least two pumps comprise at least three pumps, or at least five pumps communicating, notably directly, with the passage.

The unit comprises at least one auxiliary well or at least two auxiliary wells with auxiliary axes arranged transversely with respect to the layers.

The lubrication unit comprises a duct in which the passage is formed and which possibly has a triangular or pentagonal external profile.

The body exhibits two opposite faces, the duct extending from one opposite face to the other.

The duct comprises a principal elongation forming a first curvature and then a second curvature in the opposite direction to the first curvature.

The layers are planar and/or parallel to one another.

The body comprises an opening separating the central barrel from the duct, at least locally.

The profile forms the internal surface of the passage.

The first straight line and the second straight line are inclined with respect to one another by at least: 20° or 30°; and/or are inclined differently with respect to the layers.

The body forms an external casing of the lubrication unit.

The main housing exhibits the shape of a cylinder, the principal axis being the axis of symmetry of the cylinder.

The principal axis is parallel to and/or offset from the axis of rotation or axes of rotation of the at least two pumps, the pumps possibly having an axis of rotation in common.

The main axis is parallel to the auxiliary axis or to each auxiliary axis.

The body exhibits outlet apertures connecting each pump to the passage.

The body is of one piece and/or formed in one material and/or produced by additive manufacturing in layers.

The auxiliary axes are parallel.

The main housing is formed in the main barrel.

The internal profile extends over at least: 5%, or 10%, or 15%, or 20%, or the majority of the length of the passage.

The body exhibits two opposite ends, the passage connecting the said opposite ends. The ends may be opposite along one of the layers of the body and/or in the plane of one of the layers.

The straight lines and the end are not essential aspects of the present application. The present application also relates to a turbomachine lubrication unit comprising at least two pumps and a body which exhibits a passage communicating with each of the pumps, notable in that the material of the body exhibits a stack of layers in which the pumps are housed, the passage exhibiting a triangular internal profile with at least two or three sides arranged transversely with respect to the layers, and/or which are arranged so that they are inclined with respect to the direction of stacking of the layers. The sides may form a first, a second, and possibly a third, straight line.

Another subject of the present application is a turbomachine, notably an aircraft turbojet engine able to operate with negative vertical acceleration, comprising a lubrication circuit with a lubrication unit, notable in that the lubrication unit is in accordance with the present application, preferably the turbomachine comprising several rotary bearings each independently connected to one of the pumps of the lubrication unit.

Another subject of the present application is a method for manufacturing a lubrication unit for a turbomachine, notably an aircraft turbojet engine, the lubrication unit comprising at least two pumps and a casing with a body housing the at least two pumps and a passage; notable in that the passage comprises an internal profile with a first straight line and a second straight line forming one end of the internal profile, the method comprising the following steps: (a) designing the lubrication unit, and (b) using additive manufacturing to produce the body in stacked layers so as progressively to create the first straight line and/or the second straight line transversely to the stacked layers, the unit being notably in accordance with the present application.

According to one advantageous embodiment of the present application, step (b) of producing by additive manufacturing in layers is an additive manufacturing process using layers of powder, notably aluminium or titanium powder.

Another subject of the present application is a method for manufacturing a turbomachine, notably aircraft turbojet engine, lubrication unit, the lubrication unit comprising one or several pumps and a body common to each pump: notable in that the method comprises the steps: (a) of designing the lubrication unit; and (b) of using additive manufacturing to produce the body in layers in a direction of manufacture, notably a direction of stacking of the layers; and in that the body exhibits a passage connected to each of the pumps, the said passage exhibiting a pointed end which burrows into the stack according to the thickness of the layers, the unit being notably in accordance with the present application.

In general, the advantageous embodiments of each subject matter of the present application are equally applicable to the other subject matters of the present application. Each subject matter of the present application can be combined with the other subject matters, and the subject matters of the present application can also be combined with the embodiments of the description, which in addition can be combined with one another, in any technically feasible combination unless explicitly mentioned to the contrary.

The present application makes it possible to increase the height of the passage along the pumps, while at the same time eliminating dead spaces for the fluid and optimizing the compactness of the pump in relation to its surroundings. The quantity of material used in the pump is also reduced, and this limits the mass and also cost thereof.

The duct corresponding to the passage becomes self-supporting and its shape is better able to meet the vibrational requirements of the lubrication unit, including the pressure spikes generated by the pumps themselves. The inertia of the oil circulating through the passage is taken into consideration. The triangular shape remains a simple shape which further optimizes the space available for flow and robustness. Positioning the most acutely-angled tips of the profile in opposite locations according to the direction of stacking forms part of this approach.

Orienting the central vertex towards the centre of the body makes it easier to attach it to the barrel. The layout of the straight faces and/or of the straight lines allows conformance to the shape of the central cylinder.

In the description which will follow, the terms "inlet" and "outlet" are in relation to the direction in which the oil flows during normal operation of the lubrication unit.

Figure 1:
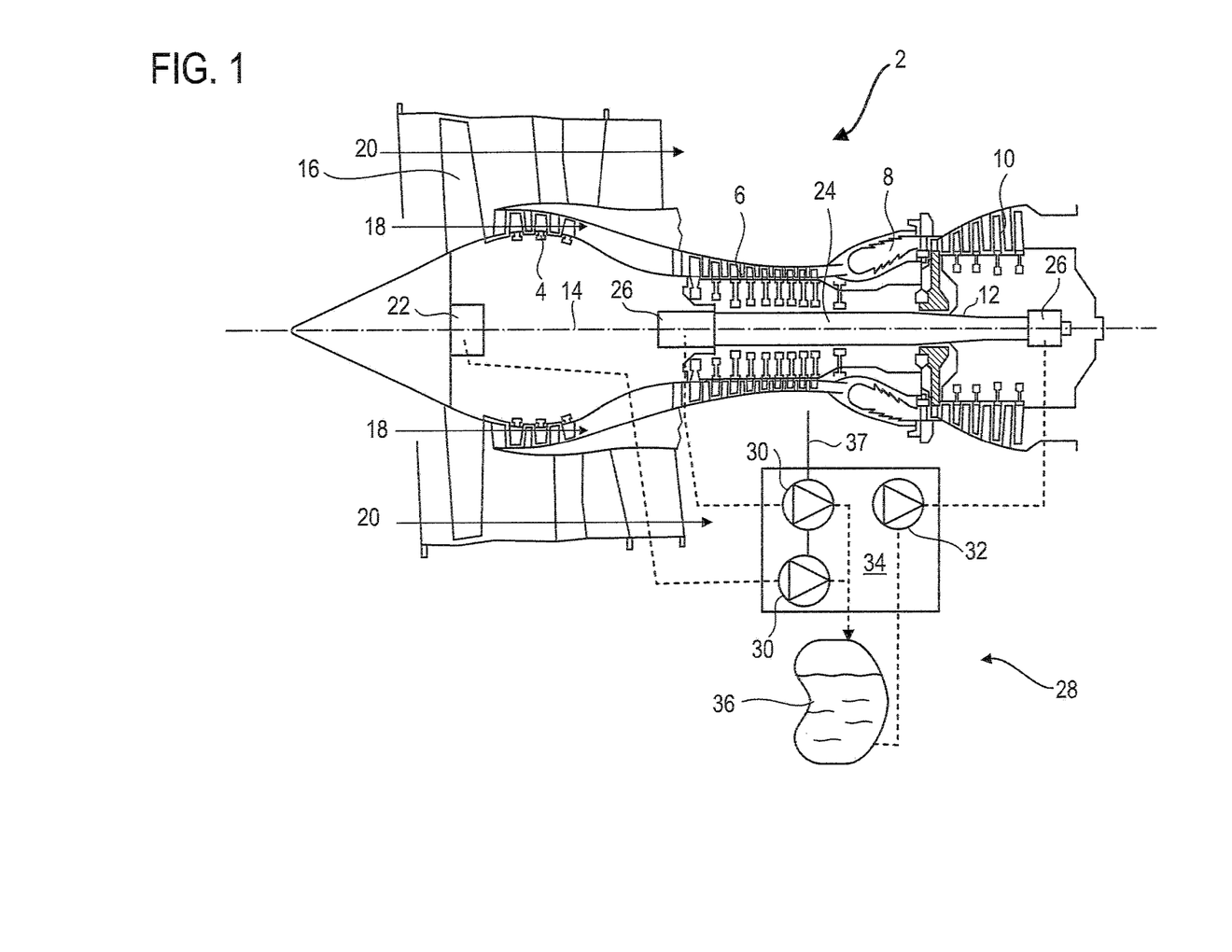
FIG. 1 depicts an axial flow turbomachine according to the present application.

FIG. 1 is a simplified depiction of an axial flow turbomachine. In this particular instance it is a bypass turbojet engine. The turbojet engine 2 comprises a low-pressure compressor 4, a high-pressure compressor 6, a combustion chamber 8 and one or more turbines 10. In operation, the mechanical power of the turbine 10 transmitted via the central shaft to the rotor 12 turns the two compressors 4 and 6. The rotation of the rotor about its axis of rotation 14 thus makes it possible to generate an air flow and to progressively compress same until it enters the combustion chamber 8.

An inlet blower most usually referred to as a fan 16 is coupled to the rotor 12 and generates a primary flow 18 and a secondary flow 20. The secondary flow 20 may be accelerated in such a way as to generate by reaction thrust required for the flight of an aeroplane.

Demultiplication means 22, such as an epicyclic reduction gear set may reduce the rotational speed of the fan 16 and/or of the low-pressure compressor 4 with respect to the associated turbine and/or to the corresponding transmission shaft 24. The latter is advantageously mounted with the ability to rotate by virtue of bearings 26 housed in lubrication chambers.

The turbomachine 2 may comprise a lubrication circuit 28 supplying the bearings 26 of the shafts 24 and the demultiplication means 22 with oil. In addition to lubricating the moving parts, the oil may cool same and warm regions that need deicing.

The circuit 28 may exhibit a recovery pump 30 and a feed pump 32 for each member or each lubrication chamber. The recovery pumps 30 like the feed pumps 32 may advantageously be combined within a lubrication unit 34. Possibly, the lubrication unit 34 pumps the oil to and from a tank 36 by virtue of a drive shaft 37.

Figure 2:
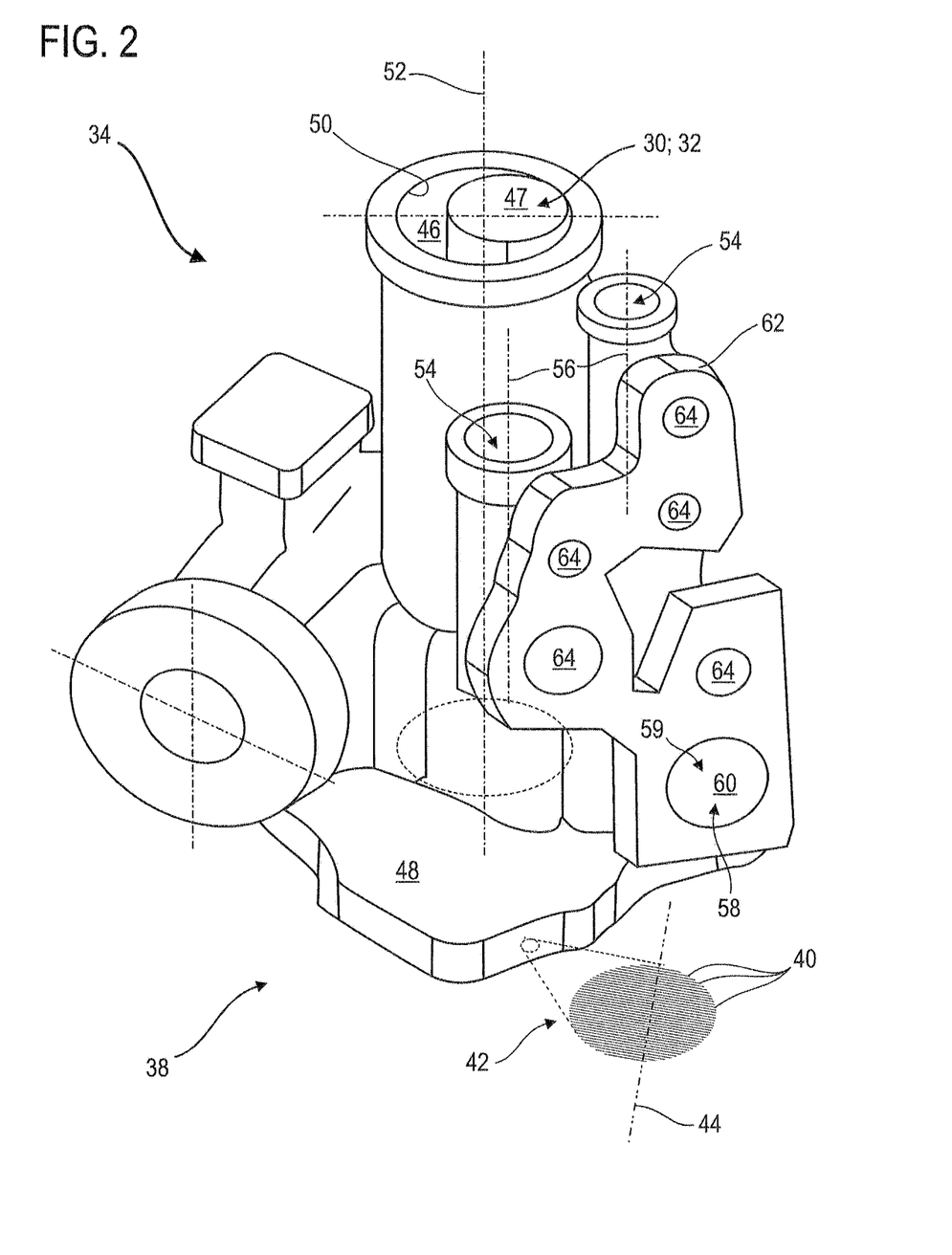
FIG. 2 outlines a body of a lubrication unit according to the present application.

FIG. 2 depicts the outer casing of a lubrication unit 34, for example such as that of FIG. 1.

The casing of the lubrication unit 34 exhibits a body 38, notably a main body. The body 38 may be of one piece. It may be formed of one material. Its material may exhibit a stack of layers 40, notably parallel layers. The body 38 may be produced in aluminium alloy just as it may be produced in titanium alloy, these materials being able to form grains and/or crystals.

In an enlargement 42, possibly under micrographic examination, the layers 40 may be identified. For example, each layer 40 may be formed of a granular material. The layers 40 may be formed by grains of material, possibly by crystals, notably metal crystals.

The layers 40 may be parallel. They may be stacked in a direction of stacking 44. The layers 40 may have thickness (es) less than or equal to: 1.00 mm, or 0.10 mm and/or greater than or equal to: 10 µm, 100 µm.

The body 38 may exhibit a main housing 46 formed by a central barrel, or central tube. The main housing 46 forms a space in which the rotors 47 of pumps (30; 32) are arranged. This main housing 46 may extend over the majority of the body 38 in the direction of stacking 44. It may extend from a mounting base 48 intended to be connected to a support such as an auxiliary gearbox, also known by the acronym "AGB".

The main housing 46 may exhibit an internal surface 50. This internal surface may be cylindrical and have an axis of symmetry 52. This axis of symmetry 52 may be specific to the housing 46 and be parallel to the axis of stacking 44; or at least be inclined, at most, by 15° with respect to the axis of stacking 44.

The body 38 may also exhibit one or more auxiliary wells 54 to contain strainers (not depicted), possibly multistage strainers. These strainers may correspond to the one described in document EP3127592A1. The strainers may be positioned at the inlet of the pumps (30; 32) and therefore at the inlet to the main housing 46, in order to catch debris circulating in the oil. Auxiliary axes 56 may correspond to the principal elongations of the auxiliary wells 54 and may be parallel to the axis of symmetry 52.

At the outlet from the pumps (30; 32), the body 38 may exhibit a passage 58 hydraulically connected to the pumps, notably to each of the pumps (30; 32) mentioned in FIG. 1. The passage 58 may be formed by a duct 59, possibly separated from the barrel, for example locally. The outlet 60 of the passage 58 is visible. This outlet forms an orifice in a plate 62 in which openings 64 corresponding to the inlets of the pumps (30; 32) are formed. The inlets may pass through the strainers.

Figure 3:
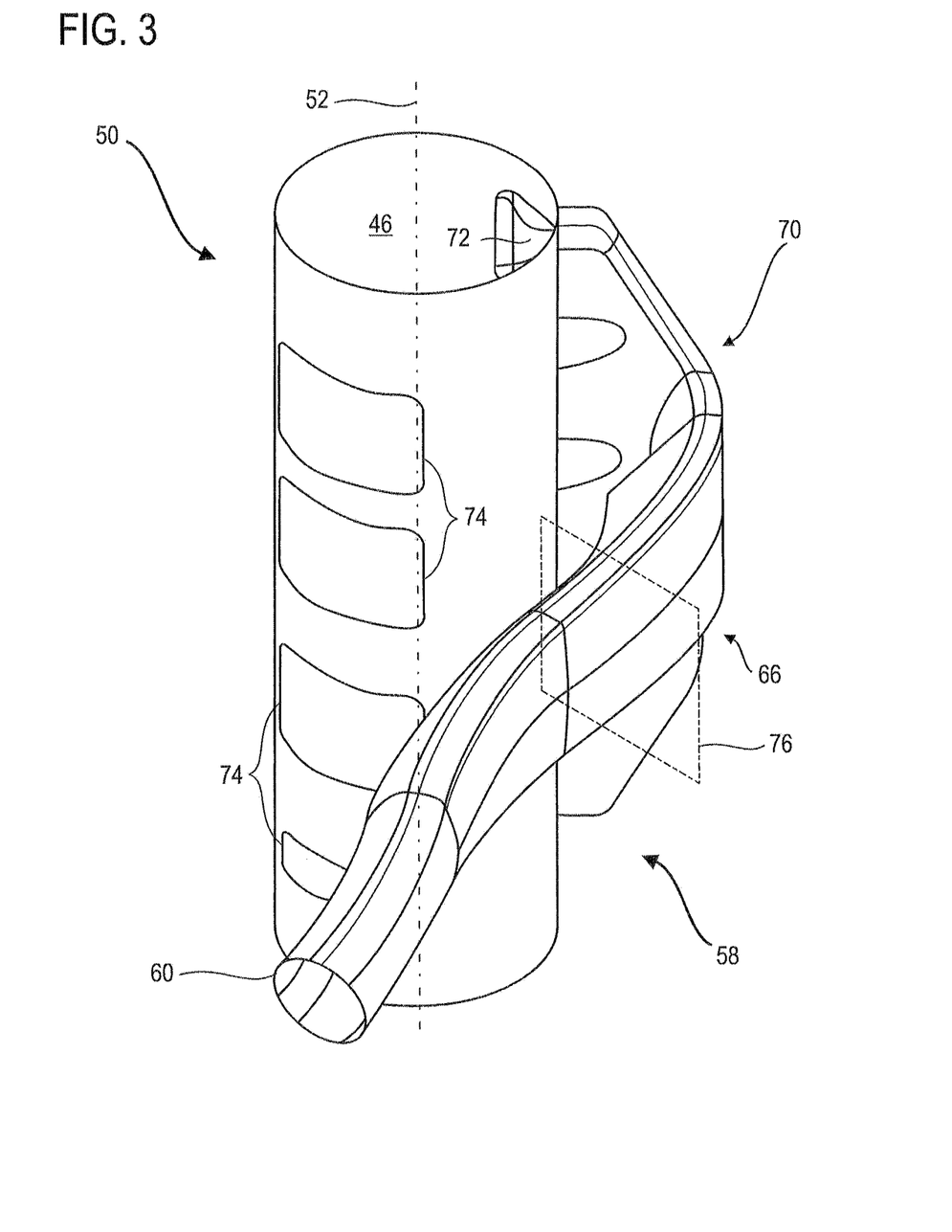
FIG. 3 illustrates a passage surface of a lubrication unit according to a first embodiment of the present application.

FIG. 3 outlines the internal surface 66 of the passage 58 such as that of FIG. 2. It also depicts the internal surface 50 of the main housing 46, notably such as that of FIG. 2. The internal surface 66 of the passage 58 may connect the internal surface 50 of the main housing 46 to the outlet 60.

The passage 58 may notably comprise a manifold section 70 connected to each of the pumps independently. Outlet apertures 72 may connect the manifold section 70 to the housing 46, whereas inlet apertures 74 are on the opposite side with respect to the axis of symmetry 52, namely diametrically opposite. The section 70 may extend over the majority of the housing 46.

The passage 58 may exhibit a reversal of curvature in the plane of the layers. It may form an S-shape, and possibly a question mark. It may turn, possibly make a U-turn, in one direction in the region of the housing 46, for example in order to wrap around it in order to observe a certain level of compactness; and then turn in the other direction in the region of the outlet 60. The outlet 60 may be oriented in the same direction as the inlet apertures 74 and/or as the outlet apertures 72.

The passage 58 may exhibit, at least locally, an internal profile observed in a plane of section 76. Its internal surface 66 may be generated by the internal profile, at least locally. This internal surface 66 may exhibit a quarter-turn between the manifold 70 and the profile.

The plane of section may be perpendicular to the mean line of the passage 58, which notably passes through the centre of gravity of its constituent sections. The internal profile may generate the internal surface 66 of the passage 58.

Figure 4:
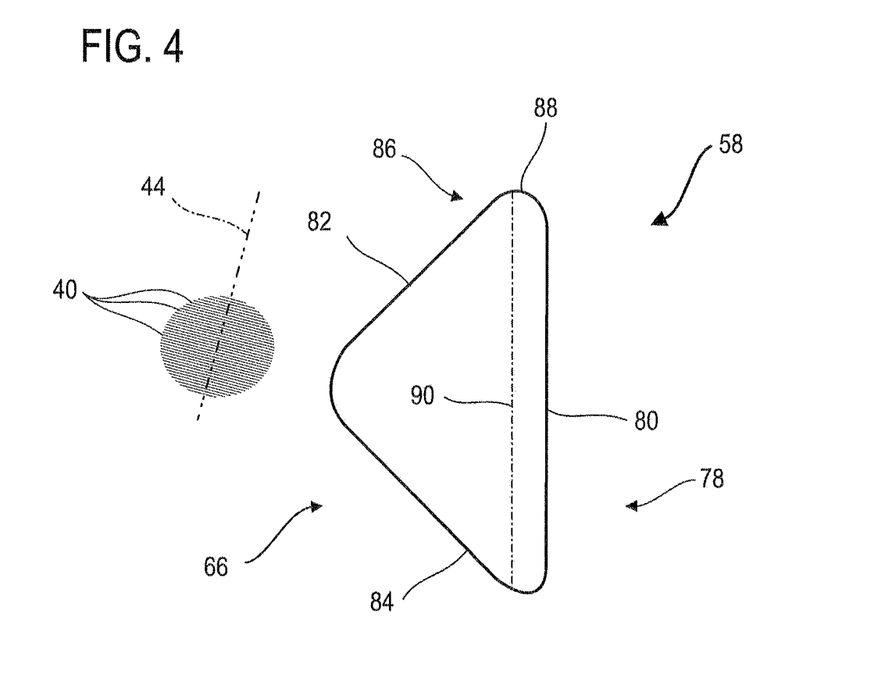
FIG. 4 shows a profile of the passage according to the first embodiment of the present application.

FIG. 4 outlines an internal profile 78 of the passage 58, notably of the passage as depicted in relation to FIGS. 2 and 3.

The internal surface 66 of the passage 58 may comprise a triangular internal profile 78. This profile 78 may comprise a first straight line 80, a second straight line 82 and a third straight line 84. These straight lines (80-84) are inclined relative to one another. The straight lines (80-84) may generate straight surfaces or ruled surfaces. They may comprise planar portions.

At least one or each end 86, in the direction of stacking 44 of the layers 40, is formed by at least two of the straight lines (80-84). They may exhibit different inclinations with respect to the direction of stacking 44. The first straight line 80 may follow the direction 44, and possibly be parallel thereto. The second straight line 82 may be more inclined with respect to the direction of stacking, and this inclination may be comprised between 20° and 60° inclusive. A fillet radius 88 connects the first and second straight line 82. Its radius of curvature may be comprised between 2 mm and 10 mm and is possibly equal to 4 mm.

The principal elongation 90 of the profile 78 may follow the direction of stacking 44. Alternatively, they may be inclined relative to one another by an angle less than or equal to 15°.

Figure 5:
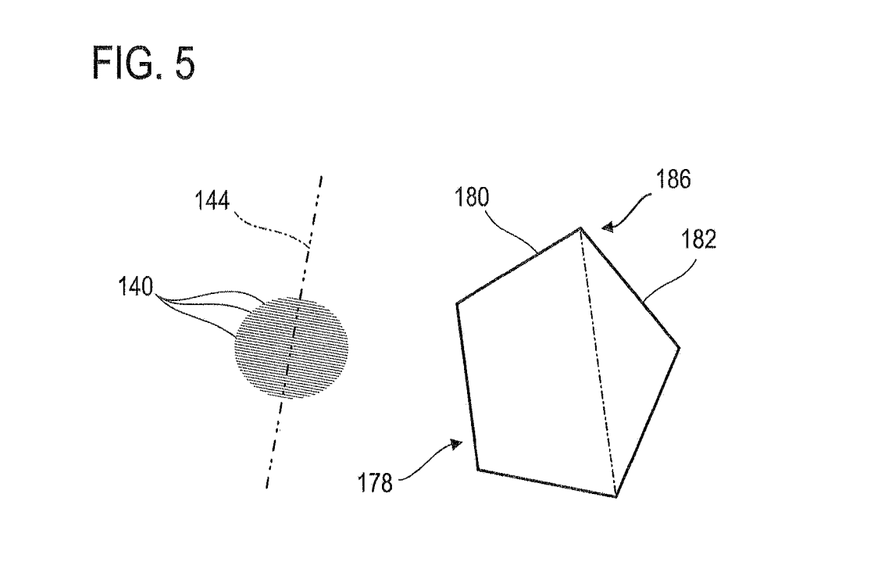
FIG. 5 shows a profile of the passage according to a second embodiment of the present application.

FIG. 5 depicts an internal profile of the passage according to a second embodiment of the present application. This FIG. 5 reuses the numbering system of the preceding figures in respect of elements that are identical or similar, although the numbering is increased by 100.

In this embodiment, the internal profile 178 forms a pentagon. A first straight line 180 and a second straight line 182 form one end 186 in the direction of stacking 144 of the layers 140. Optionally, a fillet radius connects the straight lines 180 and 182.

The internal profile according to the second embodiment may be applied to the teaching of FIGS. 1 to 3.

Figure 6:
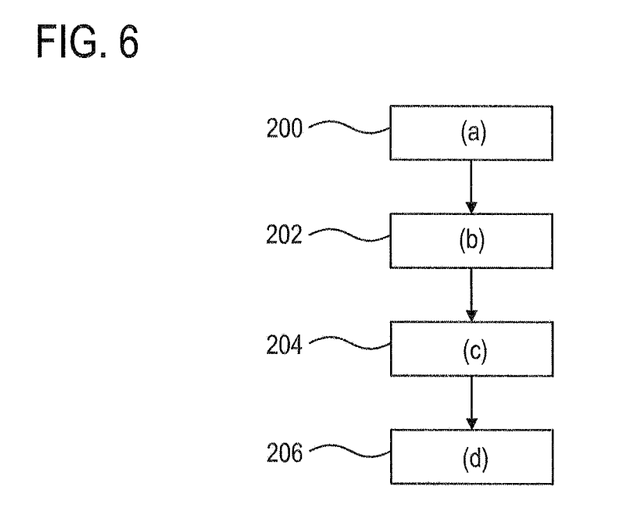
FIG. 6 is a diagram of a method for manufacturing a lubrication unit according to the present application.

FIG. 6 is a diagram of a method for manufacturing a turbomachine lubrication unit. The lubrication unit may correspond to that or those depicted in connection with FIGS. 1 to 5.

The method may comprise the following steps:

(a) of designing 200 the casing of the lubrication guide, defining the shapes of its body, including those of its passages, and then (b) of using additive manufacturing 202 to produce the body, for example on the basis of a powder, for example of titanium or aluminium.

Optionally, the method may comprise the following steps:

(c) of machining 204 the body derived from production 202 step (b) and/or (d) the fitting of inserts 206.

The inserts may comprise a sleeve, one or more filter strainers, gerotor-pump outer rotors or vane-pump rotors, magnets to trap debris, electronic sensors.

We claim:

1. A lubrication unit for a turbojet engine, the lubrication unit comprising:

at least two pumps; and a body which exhibits a passage communicating with each of the pumps;

wherein the body is made by additive manufacturing thus exhibiting a stack of layers in a direction of stacking, the pumps being housed in the said stack of layers;

wherein the passage comprises an internal surface having a first ruled surface and a second ruled surface, both ruled surfaces comprising a plurality of first straight lines and a plurality of second straight lines, each of the first straight lines and each of the second straight lines being inclined with respect to the direction of stacking, wherein the passage exhibits an end in the direction of stacking of the layers, and a profile with a first straight line of plurality of first straight lines and a second straight line of the plurality of second straight lines which form the said end.

2. The lubrication unit according to claim 1, wherein the first and second ruled surfaces are a first place and a second plane.

3. The lubrication unit according to claim 1, wherein the profile forms a triangle or a pentagon with a principal elongation in the direction of stacking, perpendicular to the layers.

4. The lubrication unit according to claim 1, wherein the internal surface of the passage further comprises:

a third ruled surface made of a plurality of third straight lines, wherein a third straight line of the plurality of third straight lines is inclined with respect to the first straight line of the plurality of first straight lines and with respect to the second straight line of the plurality of second straight lines, and is inclined with respect to the layers, the said third straight line of the plurality of third straight lines connecting the first straight line of the plurality of first straight lines to the second straight line of the plurality of second straight lines.

5. The lubrication unit according to claim 1, wherein the end of the profile comprises:

a fillet radius connecting the first straight line of the plurality of first straight lines to the second straight line of the plurality of second straight lines, the fillet radius being less than or equal to: 10 mm or 4 mm.

6. The lubrication unit according to claim 1, wherein the passage extends over the majority of the body in the direction of stacking.

7. The lubrication unit according to claim 1, wherein the first straight line of the plurality of first straight lines is inclined by at most 15° with respect to the direction of stacking.

8. The lubrication unit according to claim 1, wherein the second straight line of the plurality of second straight lines is inclined by at least 30° with respect to the layers.

9. The lubrication unit according to claim 1, wherein the body exhibits a main housing accommodating the at least two pumps, the housing exhibiting a main axis in the direction of stacking.

10. The lubrication unit according to claim 9, wherein the direction of stacking is more inclined with respect to the first straight line of the plurality of first straight lines and/or with respect to the second straight line of the plurality of second straight lines than with respect to the main axis.

11. The lubrication unit according to claim 1, wherein each pump comprises:

a rotor with an axis of rotation in the direction of stacking, the rotors possibly being superposed in the direction of stacking.

12. The lubrication unit according to claim 1, further comprising:

a drive shaft for driving the pumps, the drive shaft passing through most of the layers.

13. The lubrication unit according to claim 1, wherein the at least two pumps comprise:

at least three pumps or at least five pumps communication directly with the passage.

14. The lubrication unit according to claim 1, further comprising:

at least one auxiliary well or at least two auxiliary wells with auxiliary axes arranged transversely with respect to the layers.

15. The lubrication unit according to claim 1, further comprising:

a duct in which the passage is formed and which has a triangular or pentagonal external profile.

16. The lubrication unit according to claim 15, wherein the body exhibits two opposite faces, the duct extending from one opposite face to the other.

17. The lubrication unit according to claim 15, wherein the duct comprises:

a principle elongation forming a first curvature and then a second curvature in the opposite direction to the first curvature.

* * * * *

UNITED STATES PATENT AND TRADEMARK OFFICE
CERTIFICATE OF CORRECTION

| | | |
|---|---|---|
| PATENT NO. | : 11,293,308 B2 | Page 1 of 1 |
| APPLICATION NO. | : 16/049433 | |
| DATED | : April 5, 2022 | |
| INVENTOR(S) | : Mathieu Chenoux and Nicolas Fellin | |

It is certified that error appears in the above-identified patent and that said Letters Patent is hereby corrected as shown below:

On the Title Page

Item (30) Foreign Application Priority Data should appear as follows:
Sept. 15, 2017 (BE) ................................ 2017/5656

Signed and Sealed this
Twenty-fourth Day of January, 2023

Katherine Kelly Vidal
*Director of the United States Patent and Trademark Office*